US010727456B2

(12) United States Patent
Lustig et al.

(10) Patent No.: US 10,727,456 B2
(45) Date of Patent: Jul. 28, 2020

(54) OPTIMIZED CELL COVER AND CURRENT CLIP FOR PRISMATIC CELLS

(71) Applicant: Bayerische Motoren Werke Aktiengesellschaft, Munich (DE)

(72) Inventors: Robert Lustig, Munich (DE); Thomas Hoefler, Groebenzell (DE); Michael Kreitz, Haimhausen (DE); Arno Perner, Olching (DE); Sebastian Scharner, Tuerkenfeld (DE); Peter Lamp, Landsberg am Lech (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 257 days.

(21) Appl. No.: 15/585,213

(22) Filed: May 3, 2017

(65) Prior Publication Data

US 2017/0237047 A1    Aug. 17, 2017

Related U.S. Application Data

(63) Continuation of application No. PCT/EP2015/077414, filed on Nov. 24, 2015.

(30) Foreign Application Priority Data

Dec. 10, 2014   (DE) .................. 10 2014 225 353

(51) Int. Cl.
*H01M 10/0525*   (2010.01)
*H01M 2/04*   (2006.01)
(Continued)

(52) U.S. Cl.
CPC ............. *H01M 2/043* (2013.01); *H01M 2/06* (2013.01); *H01M 2/22* (2013.01); *H01M 2/26* (2013.01);
(Continued)

(58) Field of Classification Search
None
See application file for complete search history.

(56) References Cited

U.S. PATENT DOCUMENTS

| 2010/0143786 A1 | 6/2010 | Kim |
| 2010/0233528 A1 | 9/2010 | Kim et al. |
| 2012/0148909 A1 | 6/2012 | Ito et al. |

FOREIGN PATENT DOCUMENTS

| DE | 10 2012 212 256 A1 | 1/2014 |
| JP | 2013-12363 A | 1/2013 |

OTHER PUBLICATIONS

Derwent English abstract for JP 2013-12363 (2013).*
(Continued)

*Primary Examiner* — Olatunji A Godo
(74) *Attorney, Agent, or Firm* — Crowell & Moring LLP

(57) ABSTRACT

A cell cover for a prismatic cell, in particular a lithium-based cell, is provided. The cell cover includes a cover plate having a bottom side, a top side and at least one current-carrying cutout, at least one electrical terminal arranged at the top side, at least one current clip associated with the at least one electrical terminal, each current clip being connectable to the cover plate in a corresponding connecting region of the bottom side of the cover plate. A corresponding electrical conductor is arranged in each current-carrying cutout. The electrical terminals and respective current clip are contactable with their associated electrical conductor. The cover plate has in at least one of the connecting regions at least one connecting cutout spaced apart from the current-carrying cutout. A corresponding one of the current clips is connectable to the cover plate in a positively locking manner at the connecting cutout. The top side of the cover plate, at least in sections opposite the corresponding the bottom side connecting regions, has a substantially planar shape.

16 Claims, 2 Drawing Sheets

(51) Int. Cl.
  *H01M 2/06*  (2006.01)
  *H01M 2/26*  (2006.01)
  *H01M 2/22*  (2006.01)
  *H01M 10/052*  (2010.01)

(52) U.S. Cl.
  CPC ....... *H01M 2/263* (2013.01); *H01M 10/0525* (2013.01); *H01M 10/052* (2013.01); *H01M 2220/20* (2013.01)

(56) References Cited

OTHER PUBLICATIONS

Machine-assisted English translation for JP 2013-12363 (2013).*
International Search Report (PCT/ISA/210) issued in PCT Application No. PCT/EP2015/077414 dated Mar. 2, 2016 with English-language translation (six (6) pages).
German-language Written Opinion (PCT/ISA/237) issued in PCT Application No. PCT/EP2015/077414 dated Mar. 2, 2016 (twelve (12) pages).
German Search Report issued in counterpart German Application No. 10 2014 225 353.5 dated Nov. 6, 2015 with partial English-language translation (eleven (11) pages).
Chinese-language Office Action issued in counterpart Chinese Application No. 201580052100.1 dated Nov. 20, 2018 with English translation (20 pages).
Chinese-language Office Action issued in counterpart Chinese Application No. 201580052100.1 dated Jun. 4, 2019 with English translation (nine (9) pages).
Chinese-language Office Action issued in counterpart Chinese Application No. 201580052100.1 dated Sep. 25, 2019 with English translation (five (5) pages).

* cited by examiner

OPTIMIZED CELL COVER AND CURRENT CLIP FOR PRISMATIC CELLS

CROSS REFERENCE TO RELATED APPLICATIONS

This application is a continuation of PCT International Application No. PCT/EP2015/077414, filed Nov. 24, 2015, which claims priority under 35 U.S.C. § 119 from German Patent Application No. 10 2014 225 353.5, filed Dec. 10, 2014, the entire disclosures of which are herein expressly incorporated by reference.

BACKGROUND AND SUMMARY OF THE INVENTION

The invention relates to a cell cover comprising current clips for prismatic cells.

An apparatus of this kind is known from document US patent publication no. 2012/148,909 A.

In the text which follows, the invention is described in connection with an electrochemical energy storage cell for a mobile application, in particular as an energy storage device for a drive motor in a motor vehicle; this is not to be understood to be a restriction of the invention to an application of this kind.

High demands are made of the storage density of energy storage cells for mobile applications since the storage density and therefore the weight of the energy store have a great influence on the usability of energy stores of this kind. An energy storage cell has an electrochemically active part in which the energy can be directly stored, so-called cell stack or cell winding, and a passive part. The passive part of the energy store includes, among other things, the housing device and also electrical conductors for supplying and carrying away electrical charge to/from the active part. The increase in the power density of an energy storage cell can be achieved, in particular, by improving the cell chemistry or by reducing the space requirement of the passive part.

US patent publication no. 2012/148,909 A discloses an energy storage cell in which current clips are connected to the cell cover by way of an interlocking connection. To this end, the cell cover has a curved surface into which the current clip can be inserted at its top end.

One object of the invention is to provide an improved cell cover with current clips for a prismatic cell.

A cell cover is designed to receive at least one current clip, but preferably two current clips, and electrical connections in order to allow electrical contact to be made with the electrochemical storage cell. Within the meaning of the invention, a current clip is understood to be a device which makes electrical contact with a prismatic energy storage cell and conducts current from or to said cell. In particular, an energy storage cell of this kind is designed as a stacked, folded or so-called jellyroll cell and has a square basic outline as compared with a substantially cylindrical storage cell. Cuboidal cells of this kind can, in particular, also be called pouch or coffee bag cells. Cuboidal cells of this kind also include, in particular, cells of this geometric shape with a metal or plastic housing or with a housing which is composed of at least these two materials, so-called hybrid housings.

In connection with this invention, the terms cell stack and cell winding are used in as equivalents since, in particular, the manner of layering of the anodes/cathodes, in particular (layered, stacked or wound) is of secondary importance to the invention.

The current clip can preferably be connected to an electrical connection, wherein the electrical connection is designed to make contact with the storage cell on the outside and, in particular, is designed as a so-called pole of the storage cell. In this case, inner is understood to be relative to the cell stack (anode/cathode layering). This cell stack can be accommodated in a sheathing or a housing and the area surrounding said housing or said sheathing is understood to be the "outside".

Furthermore, the cell cover has a covering plate with a bottom side and a top side. At least one, but preferably two, of the electrical connections is/are arranged on the top side of the covering plate. In particular one, but preferably two, of the current clips is/are arranged on the bottom side of the covering plate.

This covering plate has a current-carrying recess. The current clip can be connected to the electrical connection on the top side of the covering plate by way of an electrical conductor or an electrically conductive section through said current-carrying recess.

The covering plate has a connection region for connection, in particular for mechanical connection, to the current clip. The current-carrying recess is arranged in said connecting region. The current-carrying recess extends from the bottom side to the top side of the covering plate. According to the invention, the covering plate has at least one connecting recess in addition to the current-carrying recess. Said connecting recess is preferentially arranged at a distance from the current-carrying recess. Further preferentially, at least one of the current clips can be connected in an interlocking manner to the covering plate in the connecting recess.

In this case, an interlocking connection of this kind of the current clip to the covering plate is also understood to be an indirect connection. An indirect connection is preferentially a connection between an intermediate or adaptive piece, so that the current clip cannot make direct contact with the covering plate, at least in sections.

The covering plate further preferentially has an at least substantially planar or flat top side, in particular in the section which is situated opposite the connecting region on the bottom side. The opposite region is preferentially understood to mean that at least the region which is situated directly opposite the bottom side. The distance between the bottom side of the covering plate, at least in the region which directly surrounds the connecting region, and the plane within the connecting region which is designed to directly or indirectly make contact with the current clip is preferably less than double, preferentially less than 1.5 times and preferably less than 1 times the wall thickness of the covering plate in the connecting region.

Within the meaning of the invention, the covering plate is preferably understood to be a thin-walled elongate component. The covering plate is preferentially designed as an, in particular thin-walled, sheet-metal component. The covering plate further preferably contains aluminum or a steel material as a constituent part or is composed of a material of this kind. The installation space requirement in the vertical direction is reduced, in particular, by the covering plate having a planar top side/face in said vertical direction.

The prior art discloses cell covers which, in the connecting region between covering plate and current clip, have a three-dimensional deformation of the covering plate in order to establish an interlocking connection between the current clip and the covering plate. According to the invention, an interlocking connection between the current clip and the covering plate is achieved by a connecting recess, without the covering plate being three-dimensionally deformed for this purpose; in particular, an improved energy storage cell can be achieved in this way.

Within the meaning of the invention, a prismatic cell is understood to be, in particular, a lithium-based energy storage cell, in particular a lithium-ion energy storage cell. Said storage cell is preferentially characterized by its structural shape. In respect of the structural shape, a distinction is made between at least substantially cylindrical rolled storage cells and prismatic folded, layered storage cells and so-called jellyroll cells. The invention preferentially relates to substantially cuboidal or prismatic storage cells.

Within the meaning of the invention, the electrical connections are understood to be the positive pole and the negative pole of the energy storage cell for outputting or receiving the electrical power to/from outside the energy storage cell.

Within the meaning of the invention, the current clip is understood to be a device which firstly makes electrical contact with the prismatic cell and secondly outputs the electrical charge to the electrical connections or receives said electrical charge from said electrical connections. A current clip of this kind further preferentially has at least one conductor arm, but preferably two conductor arms. Said conductor arms are further preferentially designed to make electrical contact with the prismatic cell. The current clip further preferentially has a contact covering face in the direction of the covering plate. The current clip preferentially has a U-shaped cross section in the case of which the conductor arms constitute the limbs of the U and the covering face section connects the two conductor arms to one another. The current clip can rotate in relation to the covering plate, in particular during assembly. This is prevented by the interlocking connection according to the invention between current clip and covering plate.

The current clip is preferentially composed of an aluminum material or contains at least aluminum as a constituent part. A second current clip further preferentially contains copper as a constituent part or is composed of copper. The use of copper and aluminum for the current clips has proven advantageous since said metals firstly are readily electrically conductive and secondly are readily deformable.

In a preferred embodiment, the current clip can be indirectly connected to the covering plate. Within the meaning of the invention, indirect connection of the current clip to the covering plate is understood to mean that the current clip firstly makes contact with an adapter plate, and secondly the adapter plate makes contact with the covering plate. The adapter plate preferentially contains an insulating material as a constituent part or is composed of an electrically insulating material of this kind. Current is preferentially conducted from the current clip to the electrical connection by the electrical conductor which extends through the current-carrying recess. In this case, the electrical conductor can be cohesively connected both to the current clip and also to the electrical connection. The electrical conductor is further preferentially integrally formed with the electrical connection. Creepage currents between the covering plate and the current clip can advantageously be prevented in particular by defining an electrical line by said electrical conductor between the current clip and the electrical connection.

In a preferred embodiment, the covering plate has a wall thickness T in a section in which the connecting region is arranged. The connecting recess has a depth t for receiving the current clip in the covering plate. The depth t is preferably less than the wall thickness T. The connecting recess is preferentially designed as a pocket in the covering plate. A pocket is further preferentially understood to be a recess which does not completely breach the covering plate. A connecting recess can further preferentially be introduced into the covering plate by a deformation process. The strength and the rigidity of the covering plate is only slightly influenced and the current clip can be securely accommodated on the covering plate in particular by a non-continuous connecting recess.

In a preferred embodiment, the covering plate has a wall thickness T in the section in which the connection region is arranged. The recess for receiving the current clip has a depth t. Said depth t is preferentially equal to the wall thickness T. In particular, the connecting recess extends completely through the covering plate on account of the depth t and the wall thickness T being equal. The connecting recess is preferentially designed as an aperture in the covering plate. The connecting recess further preferentially extends from the bottom side to the top side of the covering plate. It is possible to hold the current clip particularly securely on the covering plate in particular through a connecting recess which completely breaches the covering plate.

In a preferred embodiment, the current clip has an electrically insulating coating in the section in which said current clip makes contact with the covering plate or the adapter plate. Said electrically insulating coating can preferentially be cohesively connected to the current clip. An electrically insulating coating of this kind is further preferentially understood to be a coating with a plastic, in particular plastic granules or as a kind of varnishing. Improved electrical insulation between the current clip and covering plate can be achieved in particular by an electrically insulating coating in the contact region between the current clip and the covering plate or between the current clip and the adapter plate.

In a preferred embodiment, at least one of the electrical connections can be connected to the current clip. This electrical connection is further preferentially electrically insulated from the covering plate. An insulating material is further preferentially provided for this electrical insulation between the electrical connection and the covering plate. The electrical connection and the current clip can further preferentially be cohesively connected to one another. The electrical connection further preferentially has an electrical conductor which extends through the current recess of the covering plate and said electrical conductor can preferentially be cohesively connected to the electrical connection or preferably integrally formed with said electrical connection. A plurality of the electrical connections are further preferentially electrically insulated from the covering plate. Creepage currents between the electrical connections and the covering plate can be prevented and the covering plate can be kept free of electrical voltages in particular by the electrical insulation of the electrical connections in relation to the covering plate.

In a preferred embodiment, at least one of the current clips contains copper or a copper alloy as a constituent part or is composed of said materials, and the electrical connection which can be connected to said current clip contains aluminum or an aluminum alloy as a constituent part or is composed of aluminum or an aluminum alloy. The current clip and the electrical connection can preferentially be connected to one another in a cohesive manner or interlocking manner. A cohesive connection is preferentially designed as a weld or solder connection. In particular, the use of a copper/aluminum material mix makes it possible to readily adapt the electrical connection and the current clip to meet the respective requirements. A particularly secure connection of current clip to electrical connection is made possible in particular by an aluminum/aluminum or copper/copper connection.

In a preferred embodiment, the current clip has a contact covering face which is designed to make mechanical contact with the covering plate or the adapter plate. The current clip further has at least one conductor arm which is designed to make electrical contact with the electrochemical storage cell. In this case, the conductor arm makes contact with the electrochemical storage cell preferentially within a conductor section. The current clip extends in particular, starting from the contact covering face, at an angle of at least virtually 90°, or orthogonally to said covering face.

The current clip further preferentially has at least two conductor arms which together with the contact face form, in particular, a U-shaped cross section. A distance K between an end of the conductor section which faces the contact face and the contact covering face is, in particular, ≥1 times the wall thickness L of the current clip in the region of the contact covering face. The distance K is preferentially >2 times L, preferably >3 times L and particularly preferably >4 times L. Furthermore, the distance K is <15 times L, preferentially <12 times L, preferably <10 times L and particularly preferably <8 times L. It has been found that an excessively small distance K can lead to problems when the conductor arm makes contact with the electrochemical storage cell; on the other hand, a large distance K leads to an increased installation space requirement. In particular, selecting the distance K from the described region leads to good contact being made with the electrochemical storage cell by the conductor arm on the one hand and to a low installation space requirement on the other hand.

In a preferred embodiment, the covering plate has a plurality of connecting recesses. The covering plate preferentially has two or more connecting recesses. The connecting recesses are further preferentially symmetrically spaced apart from the current-carrying recess or are arranged symmetrically in relation to said current-carrying recess. The connecting recesses are preferentially arranged in an edge region of the contact face between the current clip and the covering plate or between the covering plate and the adapter plate. Particularly simple mounting of the current clip is made possible in particular by a symmetrical configuration of two or more connecting recesses.

The connecting recesses are further preferentially arranged in an asymmetrical manner. Unambiguous assignment of the current clip (positive/negative pole) to the covering plate is made possible in particular by an asymmetrical arrangement or configuration of the connecting recesses.

In a preferred embodiment, the adapter plate has an adapter recess for receiving the current clip. The adapter plate further preferentially has raised portions or projections opposite the side which contains the adapter recess, said raised portions or projections being designed to engage into the connecting recess on the covering plate.

The adapter recess preferentially has a T-shaped configuration. The adapter recess is preferably understood to be a recess which extends completely through the adapter plate; the adapter recess is preferably understood to be a recess which does not extend completely through the adapter plate. In particular, a T-shaped configuration of the adapter recess allows firstly secure fixing of the current clip in relation to the adapter plate and secondly unambiguous assignment of the current clip to the adapter plate.

In a preferred embodiment, at least one of the connecting recesses, preferably a plurality of or all of said connecting recesses, extends/extend as far as the edge of the covering plate. In particular, connecting recesses of this kind are understood to be recesses which have an open edge. A connecting recess which has an open edge of this kind therefore preferentially extends from within the covering plate as far as the edge of said covering plate.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
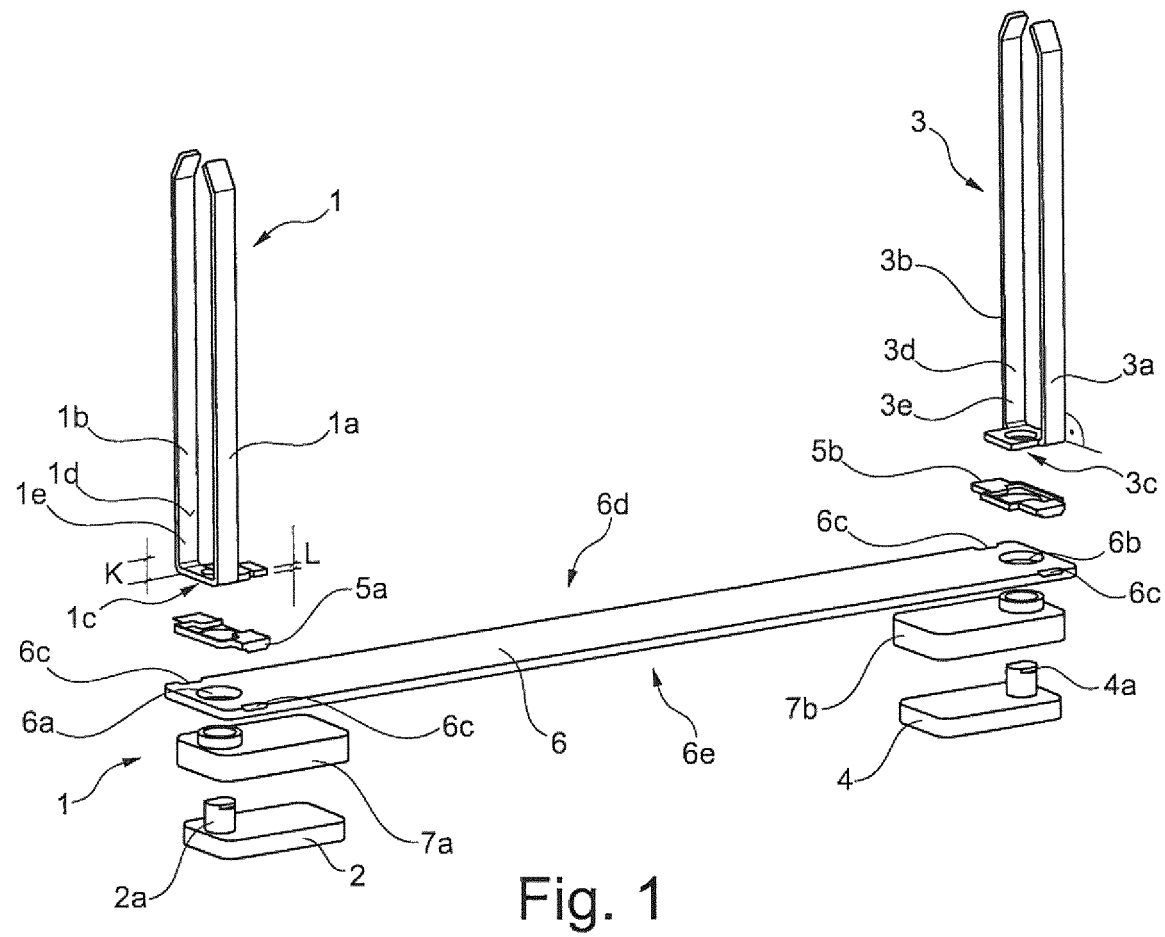
FIG. 1 shows a perspective exploded illustration of the cell cover according to an embodiment the invention.

FIG. 1 shows an exploded illustration of a cell cover according to the invention. The base plate 6 has a top side 6e and a bottom side 6d. The electrical connections 2, 4 are arranged on the top side 6e. Said electrical connections 2, 4 each have electrical conductors 2a, 4a. The electrical conductors 2a, 4a are routed through the covering plate 6 through the current-carrying recess 6a and 6b. The current clips 1, 3 are arranged on the bottom side of the covering plate 6d.

The current clips 1, 3 do not make direct contact with the covering plate 6, but rather respectively by way of an adapter plate 5a, 5b. The adapter plates 5a, 5b each form an interlocking connection with the covering plate 6. To this end, the adapter plates 5a, 5b engage into the connecting recesses 6c. The current clip 1 is composed of an aluminum base alloy. The current clip 3 contains copper as a constituent part or is composed of copper. The conductor arms 1a, 1b, 3a, 3b extend, starting from the respective covering faces 1c, 3c, in the orthogonal direction.

On the inner sides of the conductor arms, said conductor arms have contact faces 1d, 3d for making electrical contact with the electrochemical storage cell (not illustrated). In this case, the opposite conductor arms 1a, 3a likewise have contact faces which, however, are not visible in the illustration shown. The conductor arms have a wall thickness L in the region of the covering face 1c, 3c. The region for making contact with the electrochemical storage cell on the conductor arms extends in each case up to its end 1e, 3e which faces the covering face. The distance K is established between the covering face 1c, 3c and the respective end 1e, 3e. The electrical connections are respectively surrounded by an electrically insulating sheathing 7a, 7b. In this case, said sheathing 7a, 7b also extends through the current-carrying recess 6a, 6b.

Figure 2:
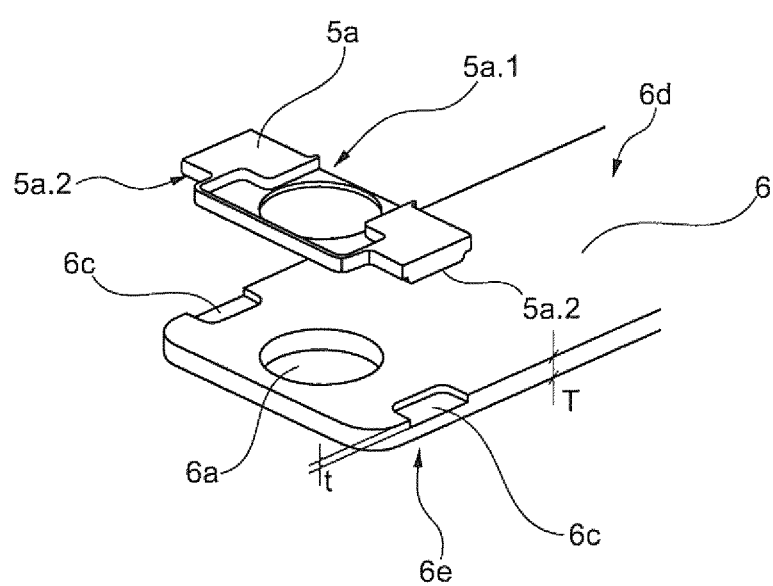
FIG. 2 shows a view of a detail of the covering plate and adapter plate of FIG. 1.

FIG. 2 is a perspective illustration of the connecting region between the covering plate 6 and the adapter plate 5a. The statements analogously likewise apply for the connection region between the covering plate 6 and the adapter plate 5b. The adapter plate 6 has two connecting recesses 6c. The connecting recesses 6c are spaced apart from the current-carrying recess 6a and are arranged symmetrically in relation to said current-carrying recess. The connecting recesses 6c are arranged as recesses in the covering plate 6 which are open at the edge. The adapter plate 5a has a T-shaped recess 5a.1 for receiving a current clip 1 (not illustrated).

On the opposite side to the recess 5a.1 for receiving a current clip, the adapter plate 5a has raised portions 5a.2. In this case, the raised portions 5a.2 are designed for interlocking connection to the recesses 6c. The recesses 6c in the covering plate 6 have a depth t. The covering plate 6 has a wall thickness T in the region in which said covering plate can be connected to the current clip and therefore also to the adapter plate 5a. The connecting recess 6c does not extend completely through the covering plate 6. The adapter plate 5a is arranged on the bottom side of the covering plate 6d. The top side of the covering plate 6e has a planar profile, at least in the connecting region to the adapter plate.

Figure 3:
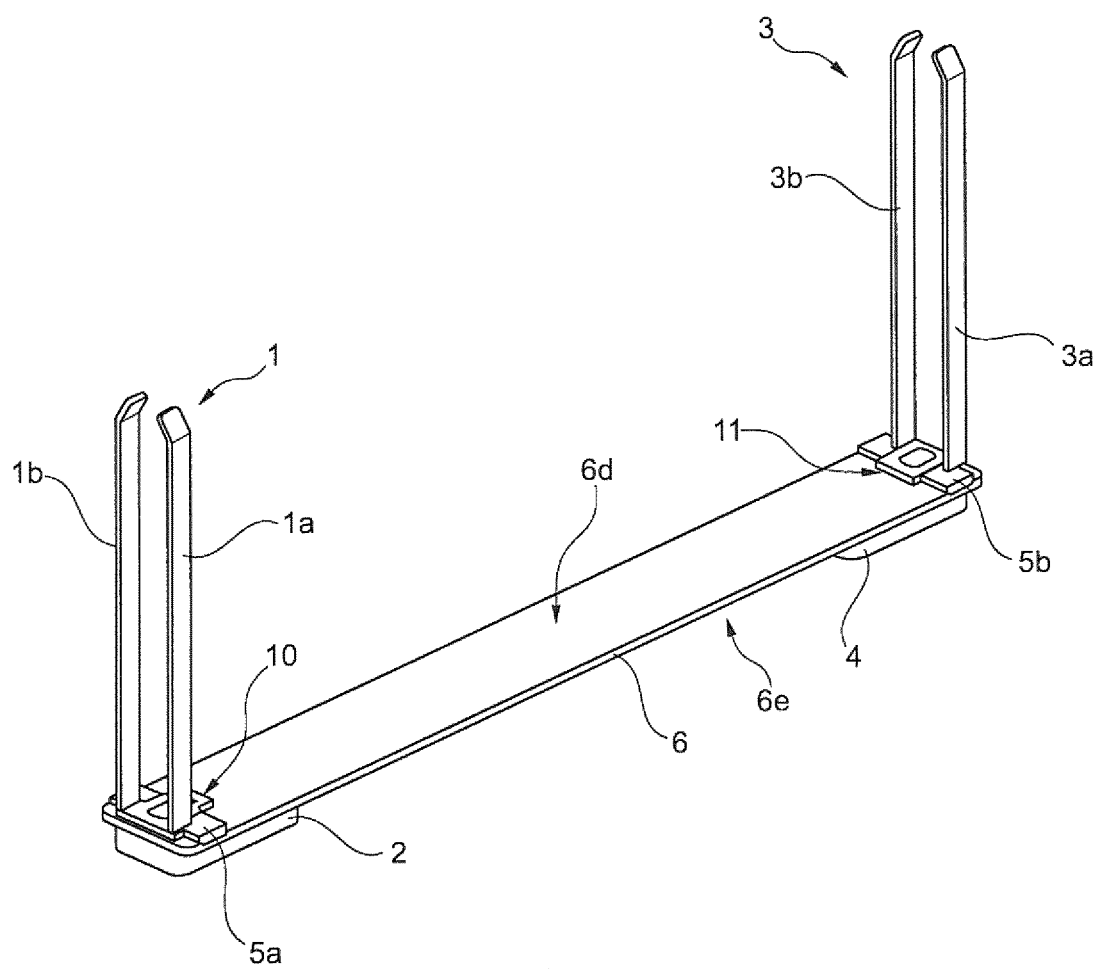
FIG. 3 shows a perspective view of the cell cover of FIG. 1.

FIG. 3 shows a perspective view of an assembled cell cover. The cell cover has a covering plate 6 with a top side 6e and a bottom side 6d. In this case, the covering plate 6 has a planar profile of the top side 6e in the region of the electrical connections 2, 4. The current clips 1, 3 each have two conductor arms 1a, 1b, 3a, 3b. The current clip 1, which is composed of an aluminum alloy, is electrically conductively connected to the covering plate 6 in the electrical connecting region 10. Furthermore, the current clip 1 is connected in an interlocking manner to the covering plate 6 by the adapter plate 5a. The current clip 3 is connected to the covering plate 6 by the adapter plate 5b. The electrical connections 2, 4 are arranged on the top side 6e of the covering plate 6. The current clip 3 does not have an electrically conductive connection to the covering plate 6 in the region 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cell cover for a prismatic cell, comprising:
   a covering plate having a bottom side, a top side and two current-carrying recesses;
   two electrical connections at the top side of the covering plate;
   a first and a second current clip, each current clip having at least one arm extending away from the bottom side of the covering plate and being connectable to the covering plate in respective connecting regions of the bottom side of the covering plate;
   an electrical conductor associated with each of the current clips, each electrical conductor being arranged in one of the current-carrying recesses and being configured to contact a respective one of the electrical connections and current clips,
   wherein
     the covering plate has at least one connecting recess in each of the connecting regions at a distance from the respective current-carrying recesses, each of the at least one connecting recesses and the respective current-carrying recess being aligned on an axis that is transverse to a covering plate longitudinal axis that extends between the current-carrying recesses,
     the current clips are configured to be connected in an interlocking manner to the covering plate at the respective connecting recesses,
     each of the first and second current clips and their respective electrical connections are retained on the covering plate by their respective electrical conductors,
     the top side of the covering plate is substantially planar in regions opposite the connecting regions of the bottom side of the covering plate, and
     the at least one arm of each of the current clips is in a plane transverse to the covering plate longitudinal axis containing the respective current-carrying recess, electrical conductor and electrical connection.

2. The cell cover as claimed in claim 1, wherein the prismatic cell is a lithium-based cell.

3. The cell cover as claimed in claim 1, wherein
   each current clip is configured to be connected to a respective adapter plate, and
   the adapter plates are configured to be connected in an interlocking manner to the respective connecting regions of the covering plate.

4. The cell cover as claimed in claim 1, wherein
   the covering plate has a wall thickness in each connecting region,
   the connecting recesses have a depth less than the covering plate wall thickness, and
   the connecting recesses are configured to receive respective current clips.

5. The cell cover as claimed in claim 3, wherein
   the covering plate has a wall thickness in each connecting region,
   the connecting recesses have a depth less than the covering plate wall thickness, and
   the connecting recesses are configured to receive respective current clips or adapter plates.

6. The cell cover as claimed in claim 1, wherein
   each of the current clips has an electrically insulating coating in a section adjacent to the covering plate arranged to prevent electrical contact with the covering plate.

7. The cell cover as claimed in claim 6, wherein
   the electrical connections are connectable to the respective current clip,
   the electrical connections are electrically insulated from the covering plate, and
   the electrical connections and the respective current clips are configured to be can be cohesively connected to one another.

8. The cell cover as claimed in claim 7, wherein
   at least one of the current clips includes copper or a copper alloy, and
   the respective one of the electrical connections connectable to the at least one of the current clips includes aluminum or an aluminum alloy.

9. The cell cover as claimed in claim 3, wherein
   each current clip has a contact covering face configured to mechanical contact with the covering plate or the respective adapter plate, and
   at least one conductor arm extends from each contact covering face in an orthogonal direction relative to the contact covering face,
   each current clip has a wall thickness in the region of the contact covering face,
   the conductor arm is configured to make electrical contact with the prismatic cell in a conductor section,
   a distance between an end of the conductor section which faces the contact covering face and the contact covering face is at least 1 times the current clip wall thickness and less than 15 times the current clip wall thickness.

10. The cell cover as claimed in claim 9, wherein a distance between an end of the conductor section which faces the contact covering face and the contact covering face is at least 2 times the current clip wall thickness and less than 12 times the current clip wall thickness.

11. The cell cover as claimed in claim 9, wherein a distance between an end of the conductor section which faces the contact covering face and the contact covering face is at least 3 times the current clip wall thickness and less than 10 times the current clip wall thickness.

12. The cell cover as claimed in claim 9, wherein a distance between an end of the conductor section which faces the contact covering face and the contact covering face is at least 4 times the current clip wall thickness and less than 8 times the current clip wall thickness.

13. The cell cover as claimed in claim 3, wherein each adapter plate has a T-shaped adapter recess configured to receive the respective current clip.

14. The cell cover as claimed in claim 13, wherein at least one of the connecting recesses extends to a lateral edge of the covering plate such that the at least one of the connecting recesses has an open side.

15. An electrochemical energy storage device, comprising:
at least one prismatic cell at least; and
at least one cell cover having
a covering plate having a bottom side, a top side and two current-carrying recesses;
two electrical connections at the top side of the covering plate;
a first and a second current clip, each current clip having at least one arm extending away from the top side of the covering plate and being connectable to the covering plate in respective connecting regions of the bottom side of the covering plate;
an electrical conductor associated with each of the current clips, each electrical conductor being arranged in one of the current-carrying recesses and being configured to contact a respective one of the electrical connections and current clips,
wherein
the covering plate has at least one connecting recess in each of the connecting regions at a distance from the respective current-carrying recesses, each of the at least one connecting recesses and the respective current-carrying recess being aligned on an axis that is transverse to a covering plate longitudinal axis that extends between the current-carrying recesses,
the current clips are configured to be connected in an interlocking manner to the covering plate at the respective connecting recesses,
each of the first and second current clips and their respective electrical connections are retained on the covering plate by their respective electrical conductors,
the top side of the covering plate is substantially planar in regions opposite the connecting regions of the bottom side of the covering plate, and
the at least one arm of each of the current clips is in a plane transverse to the covering plate longitudinal axis containing the respective current-carrying recess, electrical conductor and electrical connection.

16. A cell cover for a prismatic cell, comprising:
a covering plate having a bottom side, a top side and at least one current-carrying recess;
at least one electrical connection at the top side of the covering plate;
at least one current clip associated with the at least one electrical connection, the at least one current clip having at least one arm extending away from the top side of the covering plate and being connectable to the covering plate in a corresponding connecting region of the bottom side of the covering plate; and
at least one electrical conductor associated with the at least one current clip, the at least one electrical conductor being arranged at the at least one current-carrying recess and being configured to contact the at least one electrical connection and the associated current clip,
wherein
the covering plate has a connecting recess at the corresponding connecting region at a distance from the at least one current-carrying recess, the connecting recess and the at least one current-carrying recess being aligned on an axis that is transverse to a covering plate longitudinal axis,
the at least one current clip is configured to be connected in an interlocking manner to the covering plate at the corresponding connecting recess,
each of the first and second current clips and their respective electrical connections are retained on the covering plate by their respective electrical conductors,
the top side of the covering plate is substantially planar in regions opposite the connecting regions of the bottom side of the covering plate, and
the at least one arm of each of the current clips is in a plane transverse to the covering plate longitudinal axis containing the respective current-carrying recess, electrical conductor and electrical connection.

* * * * *